(12) United States Patent
Dunn

(10) Patent No.: US 9,881,528 B2
(45) Date of Patent: Jan. 30, 2018

(54) TRANSPARENT LIQUID CRYSTAL DISPLAY ON DISPLAY CASE

(71) Applicant: Manufacturing Resources International, Inc., Alpharetta, GA (US)

(72) Inventor: William Dunn, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 0 days.

(21) Appl. No.: 13/649,764

(22) Filed: Oct. 11, 2012

(65) Prior Publication Data
US 2013/0271696 A1    Oct. 17, 2013

Related U.S. Application Data

(60) Provisional application No. 61/546,809, filed on Oct. 13, 2011.

(51) Int. Cl.
*G02F 1/13* (2006.01)
*G09F 23/06* (2006.01)
(Continued)

(52) U.S. Cl.
CPC ............... *G09F 23/06* (2013.01); *G09F 9/35* (2013.01); *G09F 23/065* (2013.01); *G09G 3/18* (2013.01); *G09F 2023/0025* (2013.01)

(58) Field of Classification Search
CPC ........ G09F 9/35; G09F 13/04; G09F 23/0058; G09F 23/0091; G09F 23/02; G09F 23/06;
(Continued)

(56) References Cited

U.S. PATENT DOCUMENTS

| 3,629,972 A | 12/1971 | Rehberg et al. |
| 4,040,726 A | 8/1977 | Paca |

(Continued)

FOREIGN PATENT DOCUMENTS

| CA | 2815355 A1 | 5/2012 |
| CN | 101949526 A | 1/2011 |

(Continued)

OTHER PUBLICATIONS

A. Vogler & H. Kunkley, Photochemistry and Beer, Jan. 1982, 3 Pages, vol. 59, No. 1.

(Continued)

*Primary Examiner* — Thoi Duong
(74) *Attorney, Agent, or Firm* — Standley Law Group LLP

(57) ABSTRACT

Exemplary embodiment disclosed herein provide a point-of-sale advertising system for use with a display case having a front glass sheet positioned in front of a cavity for accepting goods, the system containing a transparent LCD positioned behind the front glass sheet, and a plurality of LEDs positioned adjacent to one pair of opposing edges of the LCD and arranged so that light which is emitted from the LEDs is directed backwards towards the cavity. Further embodiments may also contain a door assembly and frame surrounding the front glass sheet and LCD, a switch positioned to determine when the door assembly is open or closed, and electrical circuitry adapted to turn off the LEDs when the door is open and turn on the LEDs when the door is closed.

18 Claims, 6 Drawing Sheets

(51) Int. Cl.
*G09F 9/35* (2006.01)
*G09G 3/18* (2006.01)
*G09F 23/00* (2006.01)

(58) Field of Classification Search
CPC ........ G09F 27/00; G09F 23/065; G09F 23/04;
G09F 2023/0025; G09F 2023/0033; G09F
2007/1843; G09F 7/18; G09F 13/18;
G09F 15/0012; G09F 2013/222; H04N
1/32128; H04N 1/4325; G02F 1/13; G02F
1/1335; G02F 1/133603; G02F 1/133308;
G02F 1/1336; G02F 1/133608; G02F
1/133615; G02F 1/1313; G02F 1/13338;
G02F 1/1333; G02F 1/133385; G02F
2001/133331; G02F 2001/133311; G02F
2203/01; G07F 17/3211; G07F 17/32;
G07F 17/322; G07F 17/3209; G07F
17/3213; G07F 9/023; G07F 9/026; A47F
3/0434; A47F 3/001; A47F 3/005; A47F
3/043; A47F 3/00; A47F 3/0404; A47F
11/06; A47F 11/10; A47F 10/02; A47F
10/00; A47F 7/283; F21Y 2101/00; F21Y
2103/10; F21Y 2115/10; F21Y 2115/15;
F21W 2131/305; F21W 2131/405; F25D
27/00; F25D 2400/361; F25D 2700/04;
F25D 2700/06; F25D 2323/023; F25D
23/02; G09G 3/3406; G09G 3/003; G09G
3/36; G09G 3/18; G09G 3/006; G09G
2354/00; G09G 2320/0626; G09G
2300/04; G09G 2380/04; G09G 5/00;
G02B 6/0073; G02B 19/0061; G06K
9/00671; G06K 9/00664; G06K 9/00288
USPC ........... 463/25, 10, 17, 20; 362/249.02, 257,
362/612, 613, 84, 311.02, 125, 311.05,
362/362, 92; 312/223.1, 223.5, 7.2, 117,
312/9.1; 349/58, 65, 1, 12, 62, 16, 66;
273/309; 62/373, 3.6, 449
See application file for complete search history.

(56) References Cited

U.S. PATENT DOCUMENTS

| | | | |
|---|---|---|---|
| 4,299,092 A | 11/1981 | Ibrahim | |
| 4,371,870 A | 2/1983 | Biferno | |
| 4,853,678 A | 8/1989 | Bishop, Jr. et al. | |
| 7,413,233 B1 | 8/2008 | Jung | |
| 7,513,637 B2 | 4/2009 | Kelly et al. | |
| 7,922,381 B2 | 4/2011 | Han et al. | |
| 8,254,121 B2 | 8/2012 | Lee et al. | |
| 8,417,376 B1 | 4/2013 | Smolen | |
| 8,578,081 B1 | 11/2013 | Fils | |
| 8,683,745 B2* | 4/2014 | Artwohl et al. | 49/70 |
| 8,982,013 B2 | 3/2015 | Sako et al. | |
| 8,988,635 B2 | 3/2015 | Dunn et al. | |
| 9,052,536 B2 | 6/2015 | Artwohl et al. | |
| 9,155,405 B2 | 10/2015 | Artwohl et al. | |
| 9,500,801 B2 | 11/2016 | Dunn | |
| 9,500,896 B2 | 11/2016 | Dunn et al. | |
| 9,514,661 B2 | 12/2016 | Riegel | |
| 9,519,185 B2 | 12/2016 | Dunn et al. | |
| 9,526,352 B2 | 12/2016 | Dunn et al. | |
| 9,535,293 B2 | 1/2017 | Dunn | |
| 9,633,366 B2 | 4/2017 | Dunn | |
| 9,661,939 B2 | 5/2017 | Dunn et al. | |
| 9,684,124 B2 | 6/2017 | Dunn | |
| 9,733,420 B2 | 8/2017 | Dunn et al. | |
| 2002/0064037 A1 | 5/2002 | Lee | |
| 2002/0075552 A1 | 6/2002 | Poll et al. | |
| 2002/0187575 A1 | 12/2002 | Maruyama et al. | |
| 2003/0117790 A1 | 6/2003 | Lee et al. | |
| 2004/0160388 A1 | 8/2004 | O'Keeffe | |
| 2005/0265019 A1 | 12/2005 | Sommers et al. | |
| 2006/0215958 A1 | 9/2006 | Yeo et al. | |
| 2006/0284788 A1 | 12/2006 | Robinson et al. | |
| 2007/0151274 A1 | 7/2007 | Roche et al. | |
| 2007/0171647 A1* | 7/2007 | Artwohl et al. | 362/276 |
| 2007/0195535 A1 | 8/2007 | Artwohl et al. | |
| 2007/0214812 A1 | 9/2007 | Wagner et al. | |
| 2008/0024047 A1 | 1/2008 | Juo et al. | |
| 2008/0055534 A1 | 3/2008 | Kawano | |
| 2008/0094854 A1 | 4/2008 | Coleman et al. | |
| 2008/0284942 A1 | 11/2008 | Mahama et al. | |
| 2008/0295033 A1 | 11/2008 | Lee et al. | |
| 2009/0002990 A1* | 1/2009 | Becker et al. | 362/249 |
| 2009/0015400 A1 | 1/2009 | Breed | |
| 2009/0097227 A1 | 4/2009 | Kim et al. | |
| 2009/0121970 A1 | 5/2009 | Ozbek | |
| 2009/0278766 A1 | 11/2009 | Sako et al. | |
| 2009/0300953 A1 | 12/2009 | Frisch et al. | |
| 2010/0026912 A1 | 2/2010 | Ho | |
| 2010/0162747 A1 | 7/2010 | Hamel et al. | |
| 2010/0238394 A1 | 9/2010 | Dunn | |
| 2010/0293827 A1 | 11/2010 | Suss et al. | |
| 2010/0309687 A1 | 12/2010 | Sampsell et al. | |
| 2011/0083460 A1 | 4/2011 | Thomas et al. | |
| 2011/0116000 A1 | 5/2011 | Dunn et al. | |
| 2011/0116231 A1 | 5/2011 | Dunn et al. | |
| 2012/0020560 A1 | 1/2012 | Zarubinsky | |
| 2012/0105424 A1 | 5/2012 | Lee et al. | |
| 2012/0105428 A1 | 5/2012 | Fleck et al. | |
| 2012/0206500 A1 | 8/2012 | Koprowski et al. | |
| 2012/0206941 A1 | 8/2012 | He | |
| 2012/0275477 A1 | 11/2012 | Kim | |
| 2012/0287368 A1 | 11/2012 | Que et al. | |
| 2013/0016296 A1 | 1/2013 | Fujita et al. | |
| 2013/0063326 A1* | 3/2013 | Riegel | 345/4 |
| 2013/0120815 A1 | 5/2013 | Aspnes et al. | |
| 2013/0151006 A1 | 6/2013 | Garson et al. | |
| 2013/0158703 A1 | 6/2013 | Lin et al. | |
| 2013/0208447 A1 | 8/2013 | Maslen | |
| 2013/0211583 A1 | 8/2013 | Borra | |
| 2013/0265525 A1 | 10/2013 | Dunn et al. | |
| 2013/0271696 A1 | 10/2013 | Dunn | |
| 2014/0062316 A1 | 3/2014 | Tischler et al. | |
| 2014/0078407 A1 | 3/2014 | Green et al. | |
| 2014/0085564 A1 | 3/2014 | Hendren et al. | |
| 2014/0104538 A1 | 4/2014 | Park et al. | |
| 2014/0137065 A1 | 5/2014 | Feng et al. | |
| 2014/0144083 A1 | 5/2014 | Artwohl et al. | |
| 2014/0204452 A1 | 7/2014 | Branson | |
| 2014/0285732 A1 | 9/2014 | Tanabe et al. | |
| 2014/0333541 A1 | 11/2014 | Lee et al. | |
| 2015/0035432 A1 | 2/2015 | Kendall et al. | |
| 2015/0177480 A1 | 6/2015 | Bullock et al. | |
| 2015/0250021 A1 | 9/2015 | Stice et al. | |
| 2015/0253612 A1 | 9/2015 | Hasegawa et al. | |
| 2015/0300628 A1 | 10/2015 | Dunn et al. | |
| 2015/0309263 A2 | 10/2015 | Abovitz et al. | |
| 2015/0362667 A1 | 12/2015 | Dunn | |
| 2015/0362768 A1 | 12/2015 | Dunn | |
| 2015/0362792 A1 | 12/2015 | Dunn et al. | |
| 2015/0363819 A1 | 12/2015 | Dunn | |
| 2015/0366083 A1 | 12/2015 | Dunn et al. | |
| 2016/0037657 A1 | 2/2016 | Yoshizumi | |
| 2016/0061514 A1 | 3/2016 | Seo et al. | |
| 2016/0091755 A1 | 3/2016 | Dunn | |
| 2016/0095450 A1 | 4/2016 | Trulaske, Sr. | |
| 2016/0103275 A1 | 4/2016 | Diaz et al. | |
| 2016/0106231 A1 | 4/2016 | Dunn et al. | |
| 2016/0192451 A1 | 6/2016 | Dunn et al. | |
| 2017/0046991 A1 | 2/2017 | Riegel | |
| 2017/0068042 A1 | 3/2017 | Dunn et al. | |
| 2017/0068044 A1 | 3/2017 | Dunn | |
| 2017/0099960 A1 | 4/2017 | Dunn et al. | |
| 2017/0108735 A1 | 4/2017 | Dunn | |

(56) References Cited

U.S. PATENT DOCUMENTS

2017/0228770 A1  8/2017  Dunn
2017/0256115 A1  9/2017  Diaz

FOREIGN PATENT DOCUMENTS

| CN | 202815379 U | 3/2013 |
|---|---|---|
| EP | 3155607 A1 | 4/2017 |
| JP | 2010171010 A | 8/2010 |
| KR | 1020040045939 A | 6/2004 |
| WO | WO2006055873 A2 | 5/2006 |
| WO | WO2010116202 A1 | 10/2010 |
| WO | WO2013056109 A1 | 4/2013 |
| WO | WO2015195681 A1 | 12/2015 |
| WO | WO2017151934 A1 | 9/2017 |

OTHER PUBLICATIONS

Dave Ross, How Transmissive Film Works, 2008, 9 Pages.
Pilkington TEC Glass, for the Refrigeration Market, 2002, 2 Pages.

* cited by examiner

TRANSPARENT LIQUID CRYSTAL DISPLAY ON DISPLAY CASE

CROSS-REFERENCE TO RELATED APPLICATIONS

This application claims priority to U.S. Application No. 61/546,809, filed on Oct. 13, 2011 and incorporated herein by reference in its entirety.

TECHNICAL FIELD

Embodiments generally relate to a transparent liquid crystal display (LCD) positioned adjacent to the display glass in a display case. Embodiments include a system and method for backlighting the LCD as well.

BACKGROUND OF THE ART

Display cases are used in a number of different retail establishments for illustrating the products that are available for sale. In some instances these display cases may be coolers or freezers which are placed in grocery stores, convenience stores, gas stations, restaurants, or other retail establishments. In other instances these display cases may be non-refrigerated transparent containers used in a jewelry or watch store, bakery, deli, antique shop, sporting goods store, electronics store, or other retail establishments. While the design and appearance of the product itself does provide some point-of-sale (POS) advertising, it has been found that additional advertising at the POS can increase the awareness of a product and in turn create additional sales.

Most retail establishments already contain some POS advertising, and depending on the type of establishment the proprietor may want to limit the amount of 'clutter' in the retail area—resulting in a very limited space for additional POS advertising. It has now become desirable to utilize the transparent glass that is typically placed in display cases with additional POS advertising. Most notably, it has been considered that transparent LCDs may be positioned along with the transparent glass and could display additional advertising materials while still allowing a patron to view the products inside the display case.

SUMMARY OF THE EXEMPLARY EMBODIMENTS

One exemplary embodiment provides a transparent LCD within the door of a display case. The LCD may be sandwiched between a pair of glass substrates. A plurality of LEDs may be positioned within the door assembly to provide additional illumination of the interior of the display case, reflecting and refracting off the products within the display case, effectively creating a backlight for the transparent LCD. The assembly may contain a switch so that an electronic controlling unit can detect when the door is open or closed. When closed, the LEDs are illuminated. When open, the LEDs are preferably off, but may be simply reduced in power. In some embodiments the LEDs may remain on even when the door is opened.

Another exemplary embodiment provides a transparent LCD within the front glass assembly of a display case. In these embodiments, the LEDs may remain on whenever the LCD is displaying an image. Here, the LCD may be positioned behind a front glass. In any of the embodiments, the video data for the LCD may be provided by CAT-V cable.

Also in any of the embodiments, the LEDs may be positioned along opposing edges of the assembly or along all edges of the assembly.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

Figure 1:
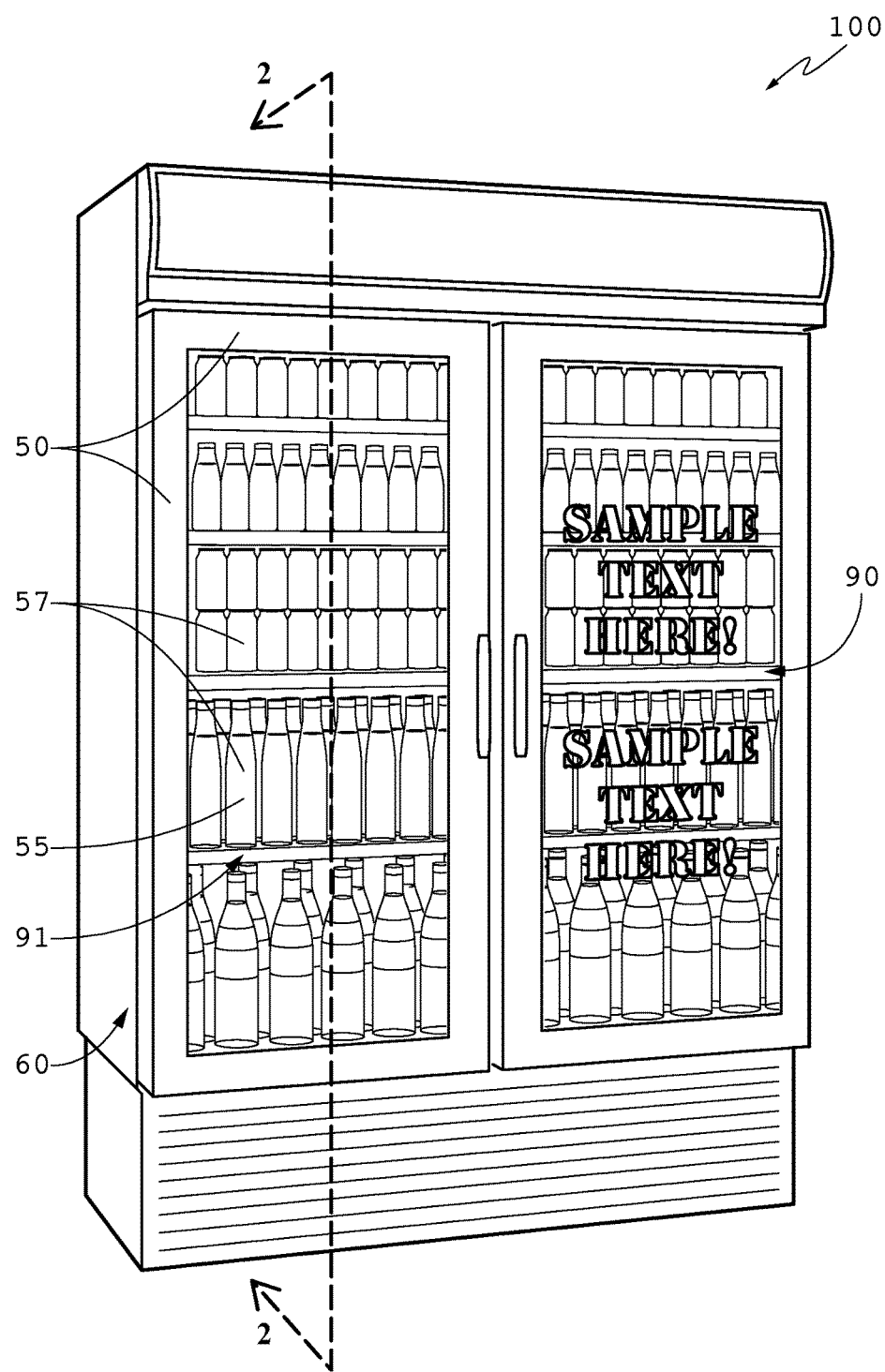
FIG. 1 is a perspective illustration of a display case containing an exemplary embodiment of the transparent LCD.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a perspective illustration of a display case 100 containing an exemplary embodiment of the transparent LCD 90 and 91. The display case 100 typically contains a plurality of products 57 which are offered for sale. As shown in the figure, transparent LCD 90 is displaying an advertising graphic while transparent LCD 91 is clear, showing a view similar to a traditional display case. The front portion of the door assembly 60 may be described in two parts. The first is a transparent portion 55 which contains the LCD 90. The second is a masked portion 50 which may allow room for various electrical components to run the LCD and backlighting. The section line 2-2 is shown as a vertical line, which cuts horizontally through the display case 100.

Figure 2:
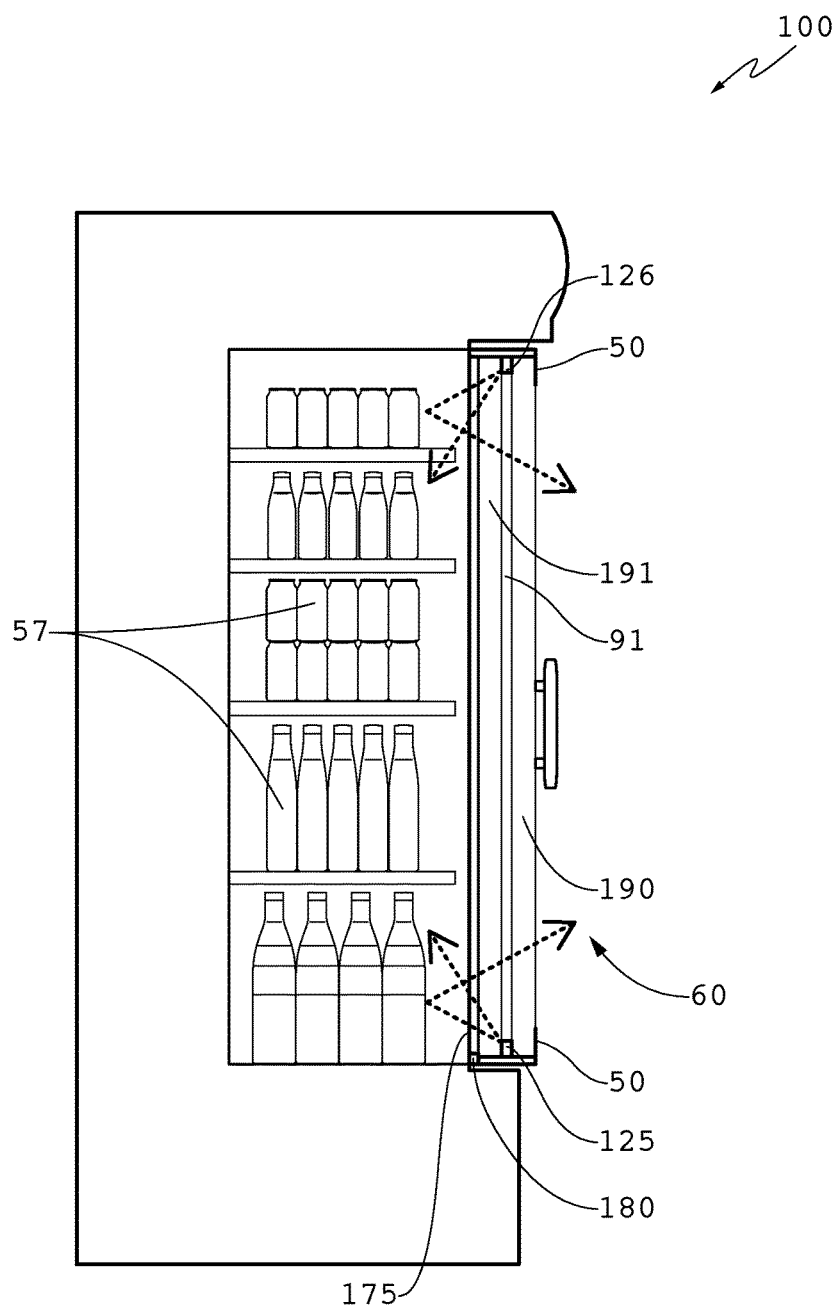
FIG. 2 is a sectional view showing the interior of the display case shown in FIG. 1.

FIG. 2 is a sectional view showing the interior of the display case 100 shown in FIG. 1. Again, various products 57 are shown within the interior of the display case 100. The transparent LCD 91 is preferably sandwiched between two pieces of glass, a front glass 190 and a rear glass 191. As known in the art, a transparent LCD typically contains the core elements of a traditional LCD (front/rear polarizers, electrical controlling layer/TFT array, and color glass) with the notable lack of a traditional direct backlight. These LCDs are typically 'normal white' such that when zero volts are applied, the cells are substantially transparent, and as the voltage increases, the cells darken.

A switch 180 is preferably positioned so that it can sense whether the door assembly 60 has been opened. The switch 180 may be attached to the rear portion of the door assembly 60 or to the door jamb 175. The switch 180 may be any one of the following: push button, push to make, push to break, or any electrical component that can break an electrical circuit. The operation of the switch 180 is described more fully below.

As known in the art, LCDs act as a light filter and thus require light to pass through the device in order to create an image. Here, to increase the luminance through the LCD 91, a plurality of LEDs 126 have been positioned along the top of the door assembly 60 along with another plurality of LEDs 125 which are positioned along the bottom of the door assembly 60. While both sets 125 and 126 are not required, it has been found that utilizing both top and bottom LEDs 125 and 126 results in the greatest luminance and uniformity of the light. The LEDs 125 and 126 may be positioned adjacent to the LCD 91 and between the front glass 190 and rear glass 191. Further, the LEDs 125 and 126 may be placed behind the masking portion 50 of the door assembly 60 so that the LEDs are not visible to a patron.

An optional light diffusing element may be positioned between the LEDs 125 and 126 and the products 57. However, as shown in the figure, the light from the LEDs 125 and 126 may be permitted to bounce and scatter off various surfaces within the interior of the display case 100. Most notably, the light from the LEDs 125 and 126 may bounce/scatter off the products 57, both increasing the visibility of the products 57 as well as increasing the uniformity of the light emitted through the LCD 91. The light from the LEDs 125 and 126 may also bounce/scatter off the interior surfaces of the display case. The LEDs 125 and 126 are generally positioned so that the primary direction of emitted light is towards the interior cavity of the display case 100.

Figure 3:
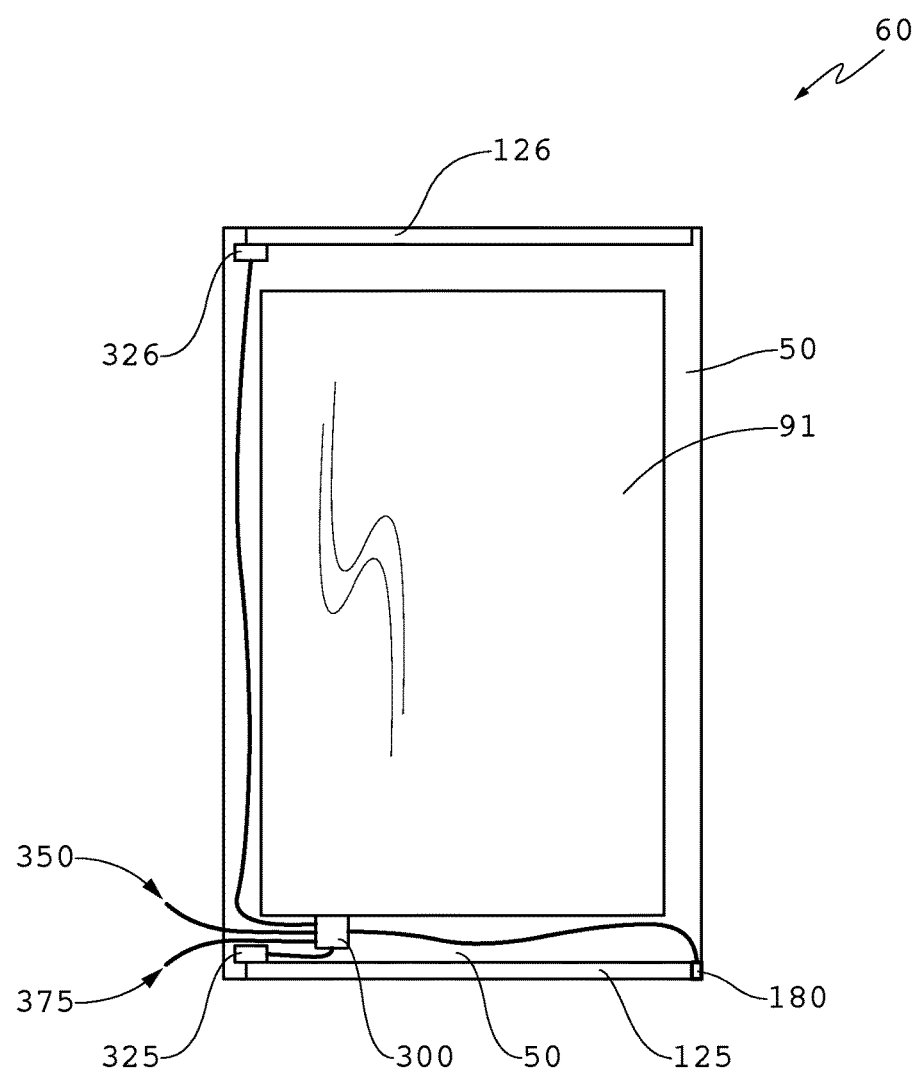
FIG. 3 is a rear elevation view of the door assembly from the embodiment shown in FIG. 1.

FIG. 3 is a rear elevation view of the door assembly from the embodiment shown in FIG. 1. The masking portion 50 is shown surrounding the LCD 91. Several electronic components may be positioned behind the masking portion 50. A first power supply 325 may be in electrical communication with the LEDs 125, which are preferably positioned along the bottom edge of the door assembly 60 and below the LCD 91. A second power supply 326 may be in electrical communication with the LEDs 126, which are preferably positioned along the top edge of the door assembly 60 and above the LCD 91. In other embodiments, the LEDs may be positioned along the vertical edges (i.e. left and right) of the door assembly 60 rather than the horizontal edges (i.e. top and bottom). In still further embodiments, the LEDs may be position along all of the edges of the door assembly (i.e. top, bottom, left, and right).

In some embodiments, a single power source may be placed in electrical communication with both sets of LEDs 125 and 126. If two power supplies 325 and 326 are used, they are preferably each in electrical communication with an electrical processor unit 300, which may be used to direct the amount of power to be sent to each set of LEDs. Even if two power supplies are not used, the sole power supply may preferably be in electrical communication with the electrical processor unit 300. Additionally, the switch 180 is preferably in electrical communication with the electrical processor unit 300. The electrical processor unit 300 may comprise any one of the following: EPROM, EEPROM, microprocessor, RAM, CPU, or any form of software driver capable of reading electrical signals from the switch 180 and controlling the power sent to the LEDs. The timing and control board (TCON) for the LCD 91 may be contained within the electrical processor unit 300 and thus is preferably in electrical communication with the LCD 91.

A power input 350 may also be in electrical communication with the electrical processor unit 300. The power from power input 350 may then be sent to the power supplies 325 and 326 or the power may be distributed directly from the power input 350 to the power supplies 325 and 326 without going through the electrical processor unit 300. A video signal input 375 may also be in electrical communication with the electrical processor unit 300. In an exemplary embodiment, the video signal input 375 would comprise a CAT-V cable. In other embodiments, the video signal input may instead comprise a wireless receiver.

Figure 4:
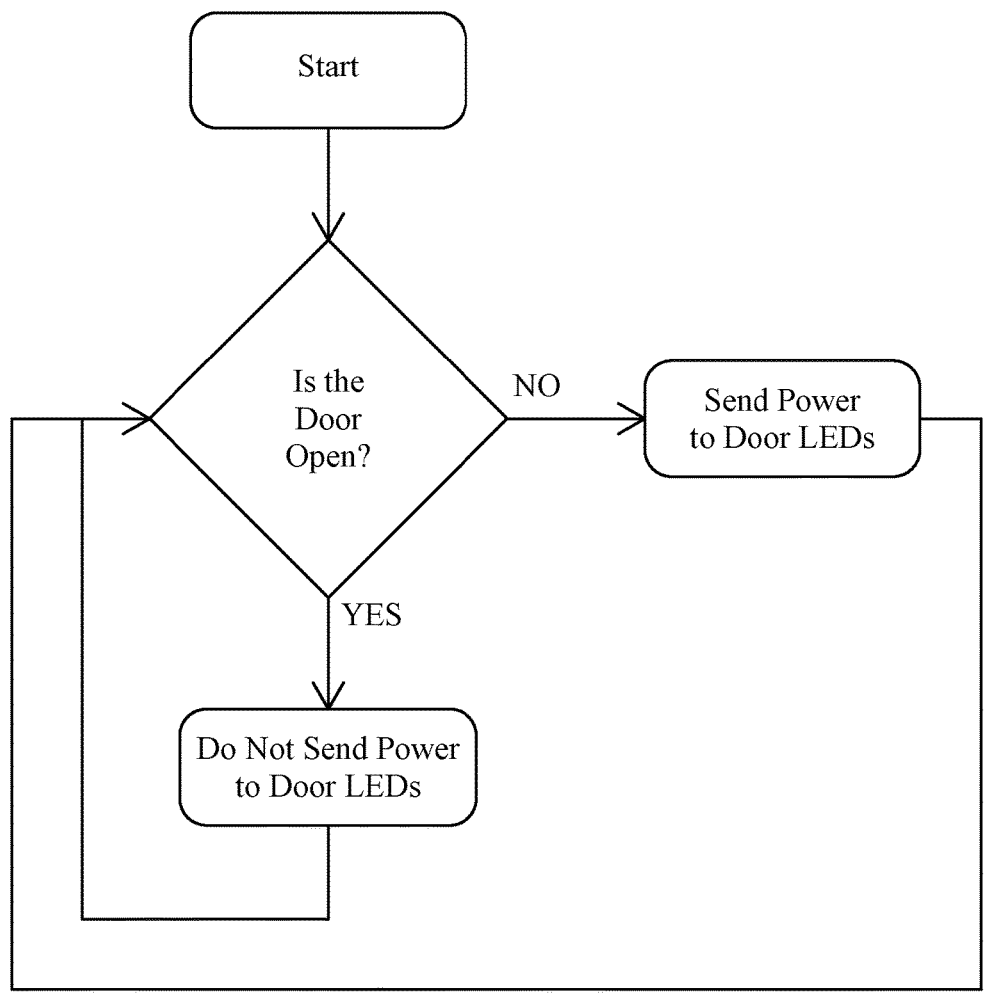
FIG. 4 is a logic flow chart showing one embodiment for controlling the LED lighting for the transparent LCD.

FIG. 4 is a logic flow chart showing one embodiment for controlling the LED lighting for the transparent LCD 91. In some embodiments, this logic may provide at least a portion of the software for the electrical processor unit 300. Once the software has started, the system would preferably read the data from the switch 180 to determine if the door is open or closed. If the door is closed, the LEDs are preferably turned on, to increase the luminance through the LCD as well as the appearance of the products. If the door is open, the LEDs are preferably turned off, so that a patron is not subject to the bright illumination of the LEDs. Of course, there should still be illumination within the interior of the display case, sometimes provided by traditional fluorescent lighting. Whether the door is currently open or closed, the system should return to re-read the data from the sensor 180 to determine if the door's status has changed since the last check. This 'loop' is preferably run almost constantly, so that changes in the door's status can be almost instantaneously accounted for.

Figure 5A:
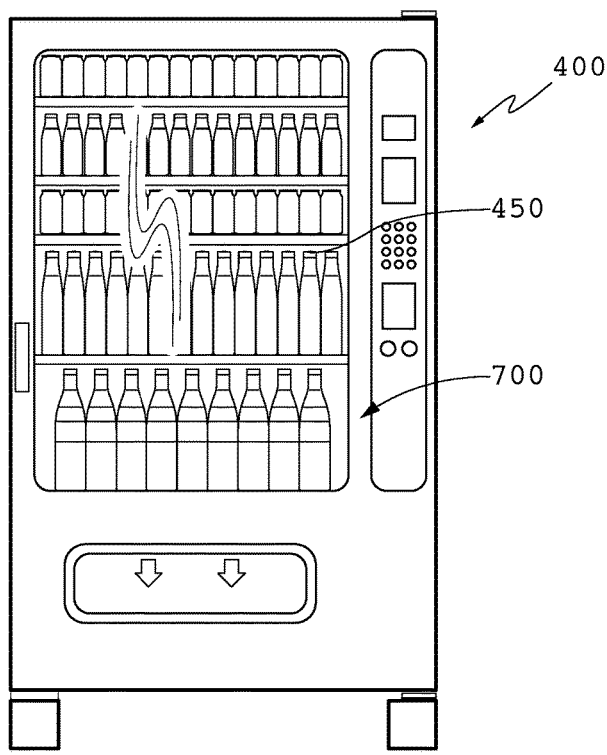
FIG. 5A is an illustration of an embodiment of the transparent LCD used with a vending machine.
Figure 5B:
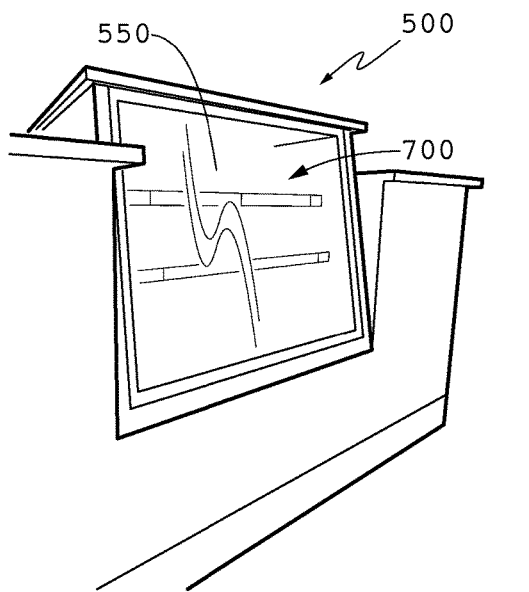
FIG. 5B is an illustration of an embodiment of the transparent LCD built within the counter of a general retail establishment.
Figure 5C:
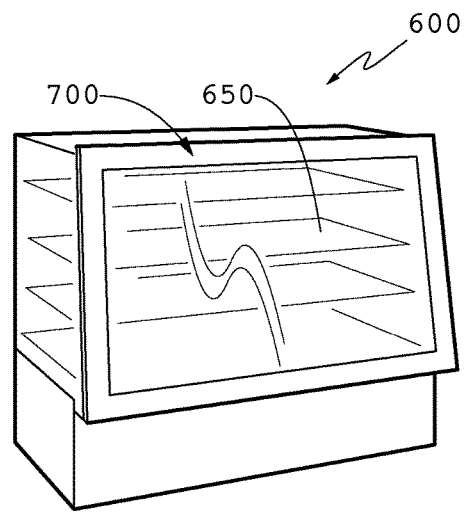
FIG. 5C is an illustration of an embodiment of the transparent LCD used with a bakery display case.

FIG. 5A is an illustration of an embodiment of the transparent LCD 450 used with a vending machine 400. FIG. 5B is an illustration of an embodiment of the transparent LCD 450 built within the counter 500 of a general retail establishment. FIG. 5C is an illustration of an embodiment of the transparent LCD 450 used with a bakery display case 600. In contrast to the embodiments described above, these embodiments do not contain a door or door assembly, but rather a front glass assembly 700.

Figure 6:
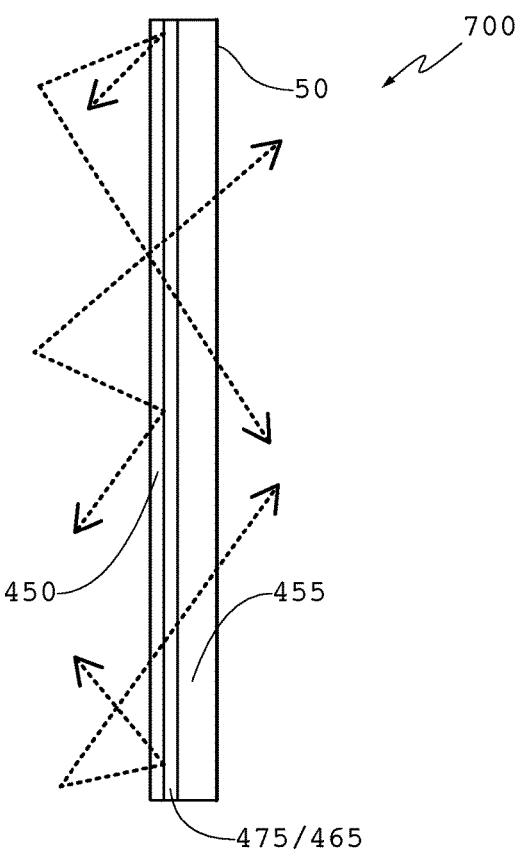
FIG. 6 is a side elevation view of an exemplary front glass assembly.

FIG. 6 is a side elevation view of an exemplary front glass assembly 700. In this embodiment, the LCD 450 is placed behind a front glass 455 and the LEDs 475/476 are positioned along the vertical edges of the front glass assembly 700. Preferably, the LEDs 475/476 are positioned behind the masking portion 50.

Figure 7:
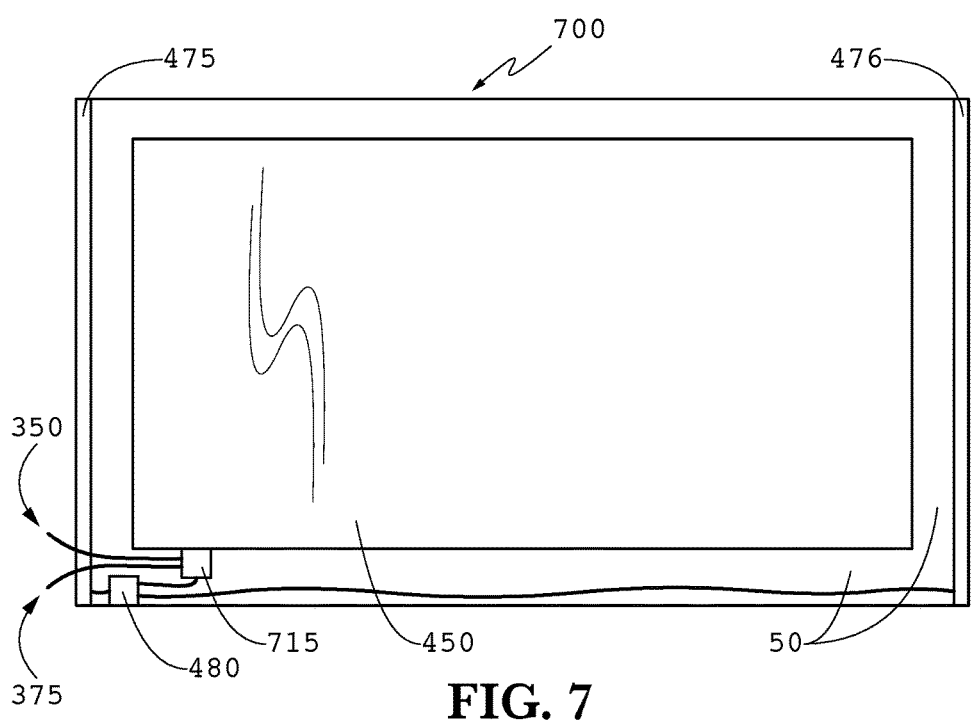
FIG. 7 is a rear elevation view of an exemplary front glass assembly.

FIG. 7 is a rear elevation view of an exemplary front glass assembly 700. In this embodiment, a first set of LEDs 475 are positioned along the left vertical edge of the front glass assembly 700 and a second set of LEDs 476 are positioned along the right vertical edge of the front glass assembly 700. A single power source 480 is in electrical communication with both sets of LEDs 475 and 476. An electrical processor unit 715 is also preferably in electrical communication with the power source 480 as well as the LCD 450.

A power input 350 may also be in electrical communication with the electrical processor unit 715. The power from power input 350 may then be sent to the power supply 480 or the power may be distributed directly from the power input 350 to the power supply 480 without going through the electrical processor unit 715. A video signal input 375 may also be in electrical communication with the electrical processor unit 715. In an exemplary embodiment, the video signal input 375 would comprise a CAT-V cable. In other embodiments, the video signal input may instead comprise a wireless receiver.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

I claim:

1. A point-of-sale advertising system for use with a display case having a front glass sheet positioned in front of a cavity for accepting goods, the system comprising:
    a transparent LCD positioned behind the front glass sheet, said LCD having a pair of opposing edges; and
    a plurality of LEDs positioned adjacent to the pair of opposing edges of the LCD and arranged so that light which is emitted from the LEDs is directed backwards towards the cavity.

2. The advertising system of claim 1 wherein:
    the LEDs are arranged so that light which is emitted reflects off goods which have been accepted into the cavity.

3. The advertising system of claim 1 further comprising:
    a door assembly and frame surrounding the front glass sheet and LCD;
    a switch positioned to determine when the door assembly is open or closed; and
    electrical circuitry adapted to turn off the LEDs when the door is open and turn on the LEDs when the door is closed.

4. The advertising system of claim 1 further comprising:
    masking around a portion of the front glass sheet wherein the LEDs are positioned behind said masking.

5. The advertising system of claim 1 further comprising:
    a second glass sheet positioned behind the LCD.

6. The advertising system of claim 1 further comprising:
    a power supply in electrical communication with the LEDs.

7. The advertising system of claim 6 further comprising:
    masking around a portion of the front glass sheet wherein the power supply is positioned behind said masking.

8. A display case comprising:
    a housing which defines a cavity for accepting goods;
    a front glass sheet positioned in front of the cavity and having a perimeter;
    a transparent LCD positioned behind the front glass sheet and having a first and second pair of opposing edges, where the first pair of opposing edges is longer than the second pair; and
    a plurality of LEDs positioned adjacent to and along the first pair of opposing edges and oriented such that emitted light is directed backwards towards the cavity.

9. The display case of claim 8 further comprising:
    a door assembly and frame surrounding the front glass sheet and LCD;
    a switch positioned to determine when the door assembly is open or closed; and
    electrical circuitry adapted to turn off the LEDs when the door is open and turn on the LEDs when the door is closed.

10. The display case of claim 8 further comprising:
    masking around a portion of the front glass sheet wherein the LEDs are positioned behind said masking.

11. The display case of claim 8 further comprising:
    a second glass sheet positioned behind the LCD.

12. The display case of claim 8 further comprising:
    a power supply in electrical communication with the LEDs.

13. The display case of claim 12 further comprising:
    masking around a portion of the front glass sheet wherein the power supply is positioned behind said masking.

14. A door assembly for a display case having a cavity for accepting goods, the door assembly comprising:
    a front glass sheet;
    a transparent LCD positioned behind the front glass sheet and having a pair of vertical edges;
    a plurality of LEDs positioned adjacent to and along the pair of vertical edges and oriented such that emitted light is directed backwards towards the cavity;
    a switch positioned to determine when the door assembly is open or closed; and
    electrical circuitry adapted to turn off the LEDs when the door is open and turn on the LEDs when the door is closed.

15. The display case of claim 14 further comprising:
    masking around a portion of the front glass sheet wherein the LEDs are positioned behind said masking.

16. The display case of claim 14 further comprising:
    a second glass sheet positioned behind the LCD.

17. The display case of claim 14 further comprising:
    a power supply in electrical communication with the LEDs.

18. The display case of claim 17 further comprising:
    masking around a portion of the front glass sheet wherein the power supply is positioned behind said masking.

* * * * *